United States Patent
Park

(10) Patent No.: US 8,171,179 B2
(45) Date of Patent: May 1, 2012

(54) APPARATUS SUPPORTING PLURALITY OF INTERFACES AND METHOD OF SETTING UP NETWORK CONNECTION OF THE SAME

(75) Inventor: Sung-Joon Park, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 182 days.

(21) Appl. No.: 12/507,929

(22) Filed: Jul. 23, 2009

(65) Prior Publication Data

US 2010/0100646 A1    Apr. 22, 2010

(30) Foreign Application Priority Data

Oct. 22, 2008 (KR) .................. 10-2008-0103850

(51) Int. Cl.
- *G06F 3/00* (2006.01)
- *G06F 15/177* (2006.01)
- *G06F 15/16* (2006.01)
- *H04M 3/00* (2006.01)
- *H04M 5/00* (2006.01)

(52) U.S. Cl. ............ 710/8; 709/227; 709/220; 379/280; 379/290

(58) Field of Classification Search .................. 709/227, 709/220
See application file for complete search history.

(56) References Cited

U.S. PATENT DOCUMENTS

| | | | | |
|---|---|---|---|---|
| 7,590,075 B2* | 9/2009 | Pirzada et al. | ................ | 370/254 |
| 7,626,994 B2* | 12/2009 | Bennett | .......................... | 370/419 |
| 7,689,725 B2* | 3/2010 | Nakamura | ........................ | 710/8 |
| 7,710,935 B2* | 5/2010 | Mahany | ........................ | 370/338 |
| 7,843,484 B2* | 11/2010 | Silverbrook | .................. | 347/264 |
| 2007/0036146 A1* | 2/2007 | Adkins et al. | ................. | 370/352 |
| 2009/0009796 A1* | 1/2009 | Park | ............................ | 358/1.15 |
| 2009/0103481 A1* | 4/2009 | Mahajan et al. | ............... | 370/329 |
| 2009/0119758 A1* | 5/2009 | Tsuchiya | .......................... | 726/5 |
| 2009/0135749 A1* | 5/2009 | Yang | ............................ | 370/310 |

FOREIGN PATENT DOCUMENTS

KR  10-2005-0081940 A  *  8/2005

\* cited by examiner

*Primary Examiner* — Chun-Kuan Lee
*Assistant Examiner* — Ronald Modo
(74) *Attorney, Agent, or Firm* — Staas & Halsey LLP

(57) ABSTRACT

A method of setting up a network connection of an image forming device connectable to a network via a first interface and a second interface, the method including setting up a network connection via the second interface, stopping operation of the first interface and initiating operation of the second interface after the setting up of the network connection via the second interface is completed, determining whether the second interface is connected to the network, and, stopping operation of the second interface and initiating operation of the first interface if determined that the second interface is connected to the network.

20 Claims, 6 Drawing Sheets

Wireless Settings

Click Next button to configure Wireless Settings.
For easy wireless settings, select Wizard.
For advanced settings, select Custom.

⊙ Wizard

○ Custom

FIG. 4

Wireless >

SSID Setup

| Network Name (SSID) | Operation Mode | Channel | Security | Signal |
|---|---|---|---|---|
| ⊙ A | Ad-hoc | 1 | Unprotected Network | Excellent |
| ○ B | Ad-hoc | 11 | Unprotected Network | Excellent |
| ○ C | Infrastructure | 1 | Unprotected Network | Very Good |
| ○ D | Ad-hoc | 10 | Unprotected Network | Good |
| ○ E | Infrastructure | 1 | Protected Network with Encryption | Good |
| ○ F | Infrastructure | 6 | Protected Network with Encryption | Very low |

[Refresh] [Back] [Next] [Cancel]

FIG. 5

WPA-Personal Security Setup

WPA Shared Key : [••••••••|]

[Back] [Next] [Cancel]

APPARATUS SUPPORTING PLURALITY OF INTERFACES AND METHOD OF SETTING UP NETWORK CONNECTION OF THE SAME

CROSS-REFERENCE TO RELATED APPLICATIONS

This application claims the benefit of Korean Patent Application No. 10-2008-0103850, filed Oct. 22, 2008, in the Korean Intellectual Property Office, the disclosure of which is incorporated herein by reference.

BACKGROUND OF THE INVENTION

1. Field of the Invention

Aspects of the present invention relate to an image forming apparatus supporting a plurality of interfaces and a method of setting up a network connection of the image forming apparatus via the plurality of interfaces.

2. Description of the Related Art

In a case where a plurality of devices supporting wired and/or wireless interfaces use a first MAC address with respect to a wired network and use a second MAC address with respect to a wireless network, the wired network and the wireless network can be distinguished, and thus the devices may perform wired communication and wireless communication simultaneously. However, if the plurality of devices use a single MAC address with respect to both the wired network and the wireless network, conflicts occur between wired communication and wireless communication, and thus the plurality of devices cannot perform wired communication and wireless communication simultaneously.

In a case where a remote-controllable user interface, such as an embedded web server (EWS), is integrated in a device supporting wired and/or wireless interfaces (e.g., a printer), as a user interface setting up a wireless network connection of the device, a wireless network connection is set up according to a setup value received from another device (e.g., a personal computer of a user) via a wired interface, and then the user eliminates a wired communication path by removing a cable connected to the wired interface such that the device can be connected to the wireless network. In particular, when a user inputs incorrect network connection values, such as an ID or a password, both the wireless network and wired network are disconnected.

SUMMARY OF THE INVENTION

Aspects of the present invention provide a method and an apparatus guaranteeing network connectivity with respect to all of a plurality of interfaces of a device while a network connection corresponding to one of the interfaces is being set up.

Aspects of the present invention also provide a computer readable recording medium having recorded thereon a computer program to execute the method above on a computer. However, aspects of the present invention are not limited thereto.

Aspects of the present invention provide a method of setting up a network connection of an image forming device connectable to a network via a first interface and a second interface, the method including setting up a network connection via the second interface; stopping operation of the first interface and initiating operation of the second interface after the setting up of the network connection via the second interface is completed; determining whether the second interface is connected to the network; and stopping operation of the second interface and initiating operation of the first interface if determined that the second interface is connected to the network.

According to another aspect of the present invention, there is provided a computer readable recording medium having recorded thereon the method of setting up a network connection stated above.

According to another aspect of the present invention, there is provided an image forming device supporting a plurality of interfaces, the apparatus including a first interface connecting to a first network; a second interface connecting to a second network; and a control unit controlling operation of the first interface and the second interface, wherein the control unit stops operation of the first interface, initiates operation of the second interface, and determines whether the second interface is connected to a network, and, after the determination is completed, stops operation of the second interface and initiates operation of the first interface.

According to another aspect of the present invention, there is provided an image forming device including a first interface connecting to a first network; a second interface connecting to a second network; a control unit, which stops operation of the first interface, initiates operation of the second interface, and determines whether the second interface is connected to a network, and, after the determination is completed, stops operation of the second interface and initiates operation of the first interface; and an image forming unit forming an image with respect to printing data transmitted via the first interface or the second interface.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 is a block diagram of a first device 1 illustrated in FIG. 1;

FIGS. 3 through 5 are diagrams showing examples of web pages for setting up a wireless network connection via the wireless interface;

DETAILED DESCRIPTION OF THE EMBODIMENTS

Figure 1:
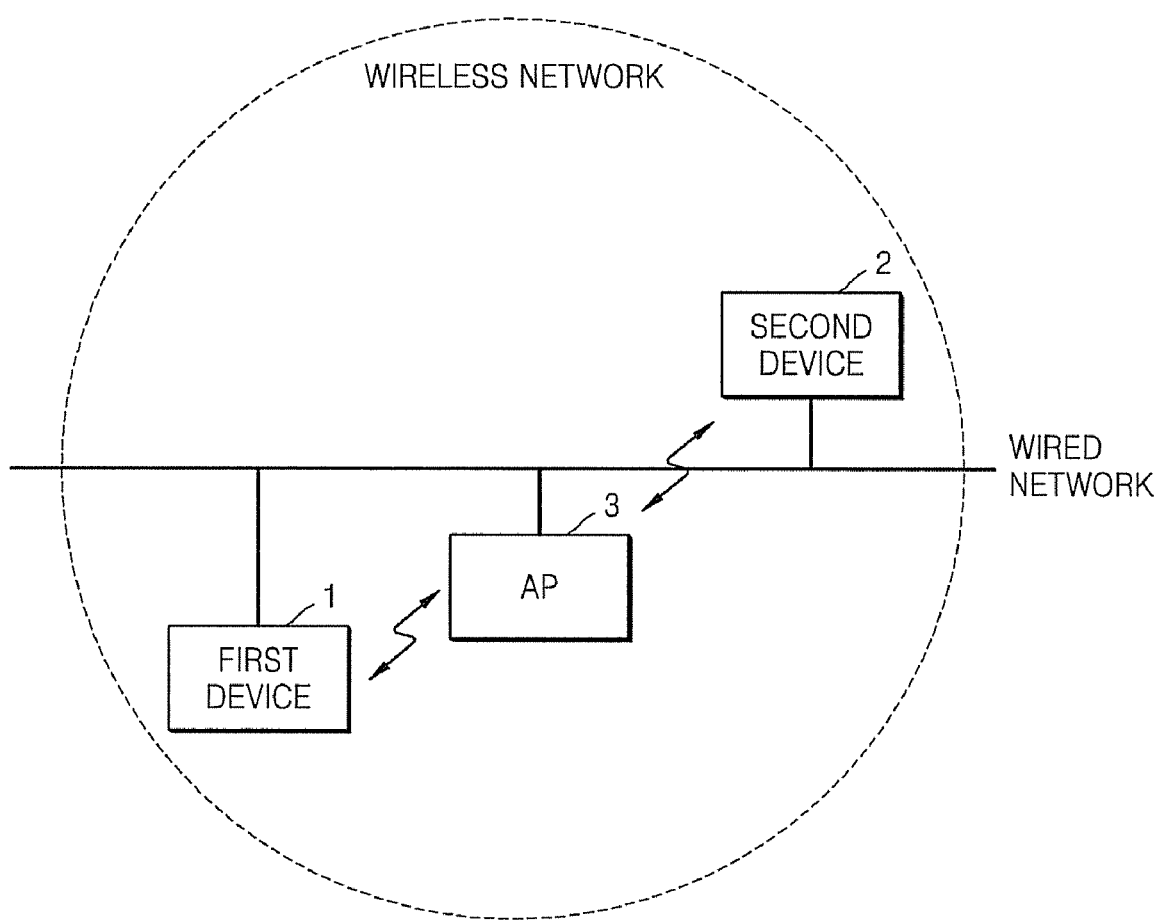
FIG. 1 is a diagram illustrating a communication environment according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a communication environment according to an embodiment of the present invention. Referring to FIG. 1, the communication environment, according to the current embodiment, is an environment in which a wired network and a wireless network co-exist. A first device 1, a second device 2, and an access point (AP) 3 are located in the communication environment, and can communicate with each other via the wired network and the wireless network.

In particular, in an infrastructure mode of wireless communication between the first device 1 and the second device 2 via the wireless network in the communication environment illustrated in FIG. 1, the first device 1 and the second device 2 communicate via the AP 3 in the wired network. In contrast, a mode of operation in which the first device 1 and the second device 2 directly communicate with each other without the AP 3 is referred as an ad-hoc mode.

Figures 2, 3:
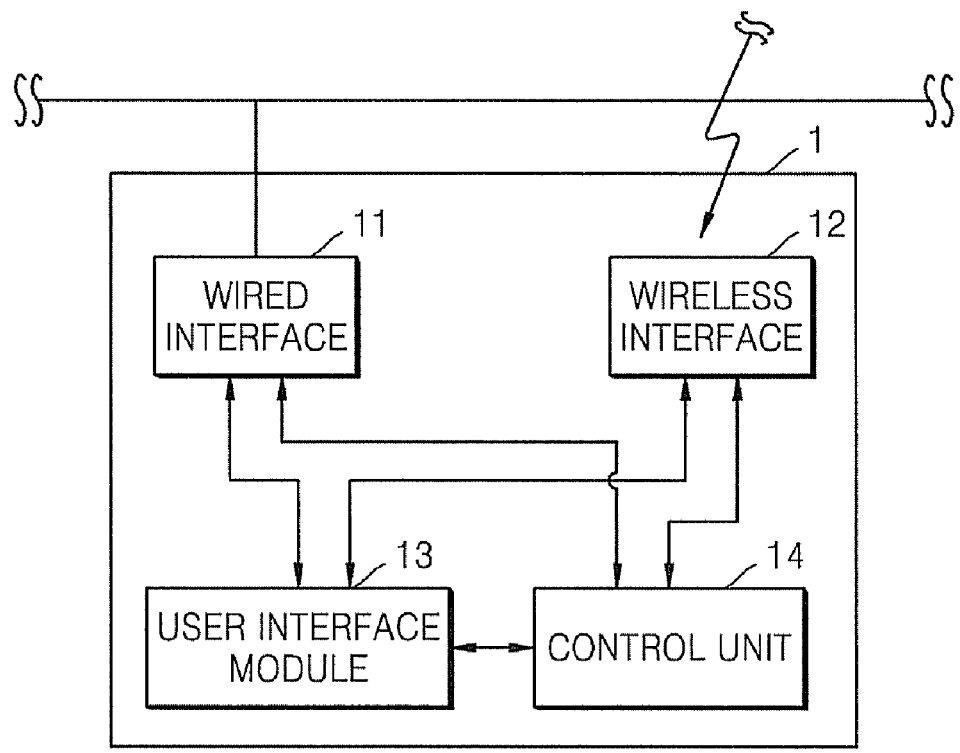

FIG. 2 is a block diagram of the first device 1 illustrated in FIG. 1. Referring to FIG. 2, the first device 1 includes a wired interface 11, a wireless interface 12, a user interface module 13, and a control unit 14. Such components may be manufactured as separate boards or separate chips, and either a part or all of the components may also be manufactured as a single board or a single chip in the form of system-on-a-chip (SOC).

The wired interface 11 supports connection of the first device 1 to a wired network. The wireless interface 12 supports connection of the first device 1 to a wireless network. The wired interface 11 and the wireless interface 12 may be on-board types or network cards. In particular, the wired interface 11 and the wireless interface 12 according to the current embodiment use one hardware address; e.g. a media access control (MAC) address. A MAC address is a hardware address of an Ethernet card, which is a type of network interface card, and is recorded in the read-only memory (ROM) of the Ethernet card.

Both the wired interface 11 and the wireless interface 12 use the same MAC address, and thus, if either one of the wired interface 11 and the wireless interface 12 is carrying out a network-related task, the other one cannot carry out a network-related task. Examples of network-related tasks include reception/transmission of data, transmission of information regarding a state of an image forming device, reception of a control command from the second device 2, or other similar network-related tasks.

When the first device 1 transmits data to the second device 2 via the wired network, the MAC address of the first device 1 becomes the source address, whereas the MAC address of the second device 2 becomes the destination address, and vice versa. In the same regard, when the first device 1 transmits data to the second device 2 via the wireless network, the same MAC address of the first device 1 becomes the source address, whereas the same MAC address of the second device 2 becomes the destination address, and vice versa. Therefore, only either the first device 1 or the second device 2 should operate at a single time to avoid conflicts between wired communication via the wired interface 11 and wireless communication via the wireless interface 12.

The user interface module 13 transmits a dialog box receiving input values setting up a wireless network connection via the wireless interface 12, to the second device 2 via the currently operating wired interface 11. In this case, the destination address of the user interface transmitted by the user interface module 13 is the MAC address of the second device 2. If the user interface module 13 of the first device 1 is embodied as an embedded web server (EWS), the dialog box may be a webpage, or other similar windows or interfaces.

FIGS. 3 through 5 are diagrams showing examples of web pages setting up a wireless network connection via the wireless interface 12. One such web page is displayed on the second device 2. A user of the second device 2 recognizes the web page, and inputs values to the web page setting up a wireless network connection via the wireless interface 12. FIG. 3 shows the first screen beginning the setting up of the wireless network connection via the wireless interface 12, whereby the user can select a method of setting up the wireless network connection. FIG. 4 shows the second screen whereby the user can select one of a plurality of networks A through F. FIG. 5 shows the third screen whereby the user can input information corresponding to wireless network security.

The user interface module 13 receives a setup value setting up the wireless network connection via the wireless interface 12, from the second device 2 via the wired interface 11. In this case, the destination address of the setup value received by the user interface module 13 is the MAC address of the first device 1. The setup value received by the user interface module 13 is a value input by the user of the second device 2 who recognizes the user interface transmitted by the user interface module 13.

When the control unit 14 completes setting up the wireless network connection, the user interface module 13 transmits a dialog box inquiring whether the user wants to verify the wireless network connection via the wireless interface 12, to the second device 2 via the wired interface 11. In this case, the destination address displayed in the dialog box transmitted by the user interface module 13 is the MAC address of the second device 2. This dialog box will also be provided in a form similar to that of web pages shown in FIGS. 3 through 6.

The user interface module 13 receives a selection value selecting whether to verify the wireless network connection via the wireless interface 12 from the second device 2 via the wired interface 11. In this case, the destination address of the selection value received by the user interface module 13 is the MAC address of the first device 1. The value received by the user interface module 13 is a value input by the user of the second device 2 interacting with the dialog box transmitted by the user interface module 13.

The user interface module 13 transmits a dialog box indicating a result of verifying the wireless network connection performed by the control unit 14 to the second device 2 via the wired interface 11. In this case, the destination address displayed in the dialog box transmitted by the user interface module 13 is the MAC address of the second device 2. This user interface will also be provided in a form similar to that of web pages shown in FIGS. 3 through 6. In particular, in a case where the wireless interface 12 is not normally connected to a wireless network, a dialog box indicating a history of connecting operations performed by the control unit 14 is transmitted together with the result of verifying the wireless network connection. In particular, this dialog box provides an input device selecting whether to switch from the wired interface 11 to the wireless interface 12 and an input device selecting whether to set up a wireless network connection via the wireless interface 12 again. The result of verifying a wireless network connection performed by the control unit 14 may also be displayed on a display apparatus installed in the first device 1.

The user interface module 13 receives a selection value selecting whether to switch from the wired interface 11 to the wireless interface 12 from the second device 2 via the wired interface 11. In this case, the destination address of the selection value received by the user interface module 13 is the MAC address of the first device 1. The selection value received by the user interface module 13 is a value input by the user of the second device 2 interacting with the dialog box transmitted by the user interface module 13.

The user interface module 13 receives a selection value selecting whether to set up a wireless network connection via the wireless interface 12 again. In this case, the destination address of the selection value received by the user interface module 13 is the MAC address of the first device 1. The selection value received by the user interface module 13 is a value input by the user of the second device 2 who recognizes the user interface transmitted by the user interface module 13.

In a case where it is not selected to verify the wireless network connection via the wireless interface 12, the wired interface 11 is switched to the wireless interface 12, or it is not selected to set up a wireless network connection via the wireless interface 12, the user interface module 13 transmits a user interface, indicating a result of setting up a wireless network connection, to the second device 2 via either the wired interface 11 or the wireless interface 12. In this case, the destination address of the user interface transmitted by the user interface module 13 is the MAC address of the first device 2. The result of setting up a wireless network connection performed by the control unit 14 may also be displayed on a display apparatus installed in the first device 1.

Figure 6:
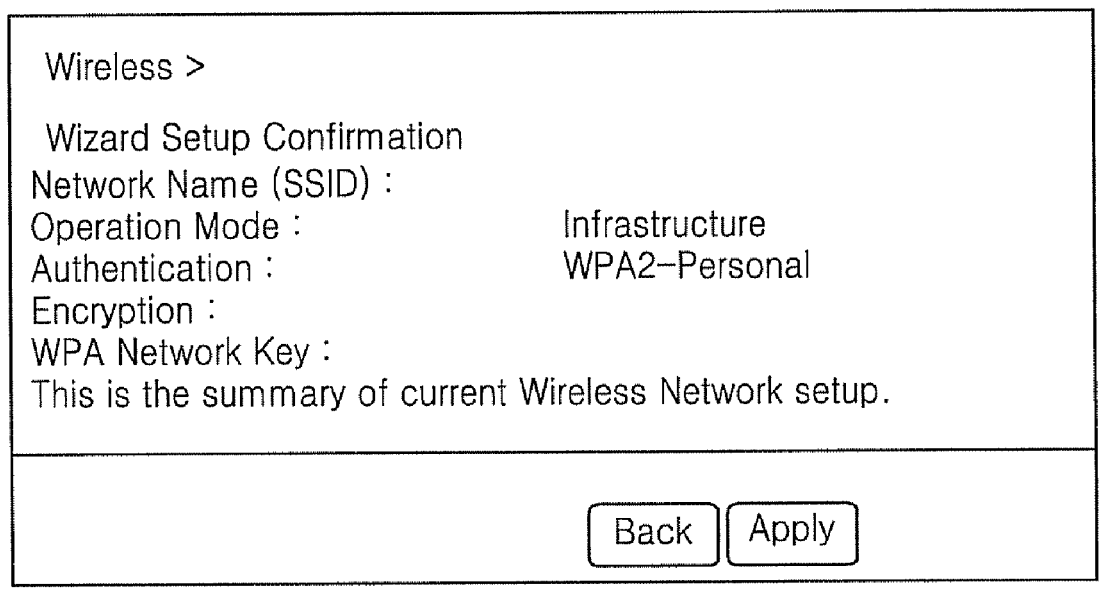
FIG. 6 is a diagram showing an example of a web page indicating a completed result of setting up a wireless network connection.

FIG. 6 is a diagram showing an example of a web page indicating a completed result of setting up a wireless network connection. In particular, in a case where the wired interface 11 is switched to the wireless interface 12, the web page is transmitted via the wireless interface 12.

The control unit 14 sets up a wireless network connection via the wireless interface 12 according to a setup value received by the user interface module 13.

If the selection value received by the user interface module 13 indicates verification of a wireless network connection, the control unit 14 stops operation of the wired interface 11 and initiates operation of the wireless interface 12. The control unit 14 may stop or initiate operations of the wired interface 11 and/or the wireless interface 12 by controlling an input and/or an output of electrical signals corresponding to the wired interface 11 and/or the wireless interface 12 via hardware or by controlling an input and/or an output of data corresponding to the wired interface 11 and/or the wireless interface 12 via software.

The control unit 14 checks the wireless network connection via the wireless interface 12 currently operating. In other words, the control unit 14 determines whether the wireless interface 12 is connected to a wireless network. For example, the control unit 14 may transmit a test frame via the wireless interface 12 to verify whether the wireless interface 12 is connected to a wireless network, and can determine whether the wireless interface 12 is connected to a wireless network by verifying whether a response with respect to the test frame is received.

Figure 7:
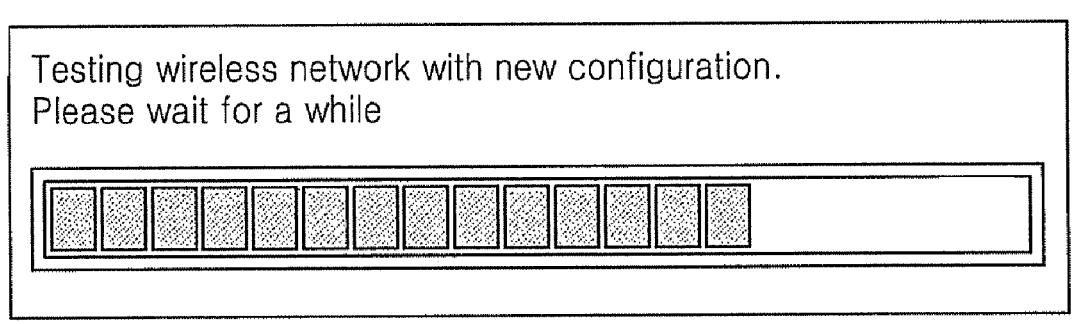
FIG. 7 is a diagram showing an example of a web page indicating that a wireless network connection is currently being verified.

FIG. 7 is a diagram showing an example of a web page indicating that a wireless network connection is currently being verified. Such a web page is displayed on the second device 2, and thus a user of the second device 2 can observe the verification of the wireless network connection.

If determined that the wireless interface 12 is not connected to a wireless network, the control unit 14 checks a history of operations of connecting the wireless interface 12 to the wireless network. For example, the control unit 14 can check the history of operations of connecting the wireless interface 12 to the wireless network by checking the status of a physical connection between the wireless interface 12 and the wireless network and checking data traffic in the wireless network.

If determined that the wireless interface 12 is connected to the wireless network and the history of operations of connecting the wireless interface 12 to the wireless network is checked, the control unit 14 stops operation of the wireless interface 12 and initiates operation of the wired interface 11.

In a case where a user selects to switch from the wired interface 11 to the wireless interface 12, the control unit 14 stops operation of the wired interface 11 and initiates operation of the wireless interface 12. Accordingly, a user can promptly switch from the wired interface 11 to the wireless interface 12 based on a result of verifying a wireless network connection via the wireless interface 12.

A typical example of the first device 1, in which the wired interface 11 and the wireless interface 12 use the same address and an internal web server is integrated, may be a printer.

Figure 8:
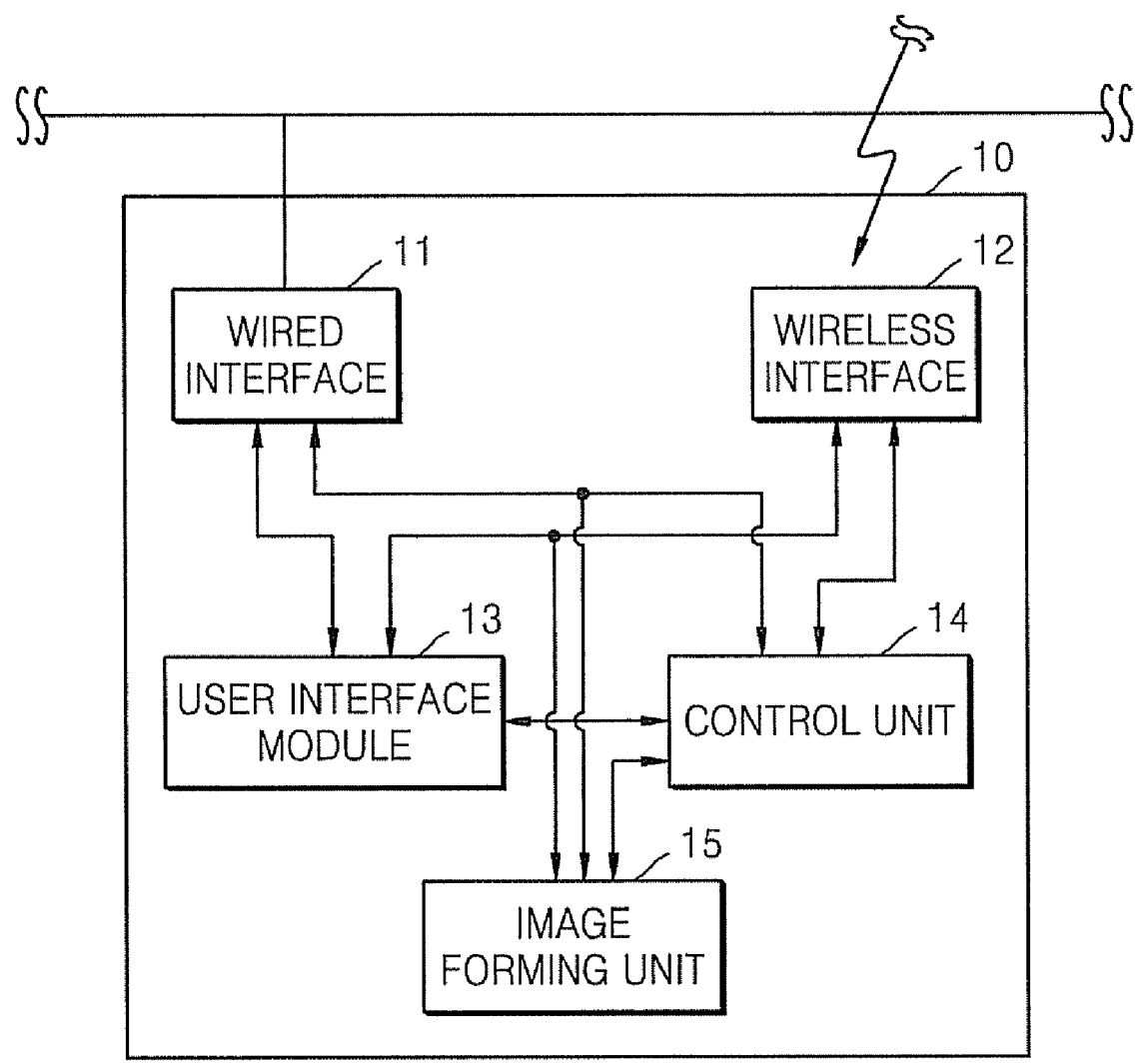
FIG. 8 is a block diagram of a printer to which functions of the first device 1 illustrated in FIG. 2 are applied, according to an embodiment of the present invention.

FIG. 8 is a block diagram of a printer 10 to which functions of the first device 1 illustrated in FIG. 2 are applied, according to an embodiment of the present invention. Referring to FIG. 8, the printer 10 according to the current embodiment includes the wired interface 11, the wireless interface 12, the user interface module 13, the control unit 14, and an image forming unit 15. Accordingly, the printer 10 illustrated in FIG. 8 further includes the image forming unit 15 as compared to the components illustrated in FIG. 2, and the wired interface 11, the wireless interface 12, the user interface module 13, and the control unit 14 of the printer 10 perform operations as described above and perform additional operations related to the image forming unit 15. Descriptions of operations of the wired interface 11, the wireless interface 12, the user interface module 13, and the control unit 14 provided above will not be repeated below, and additional operations thereof related to the image forming unit 15 will be described.

The user interface module 13 transmits a user interface receiving a printing instruction with respect to printing data, to the second device 2 via either the wired interface 11 or the wireless interface 12. The user interface module 13 receives the printing instruction from the second device 2 via either the wired interface 11 or the wireless interface 12. The printing instruction received by the user interface module 13 is a value input by a user of the second device 2 who recognizes the user interface transmitted by the user interface module 13.

The control unit 14 controls the image forming unit 15 according to the printing instruction received by the user interface module 13. According to the control of the control unit 14, the image forming unit 15 receives printing data via either the wired interface 11 or the wireless interface 12, and forms an image with respect to the printing data on a printing paper, etc.

Figure 9:
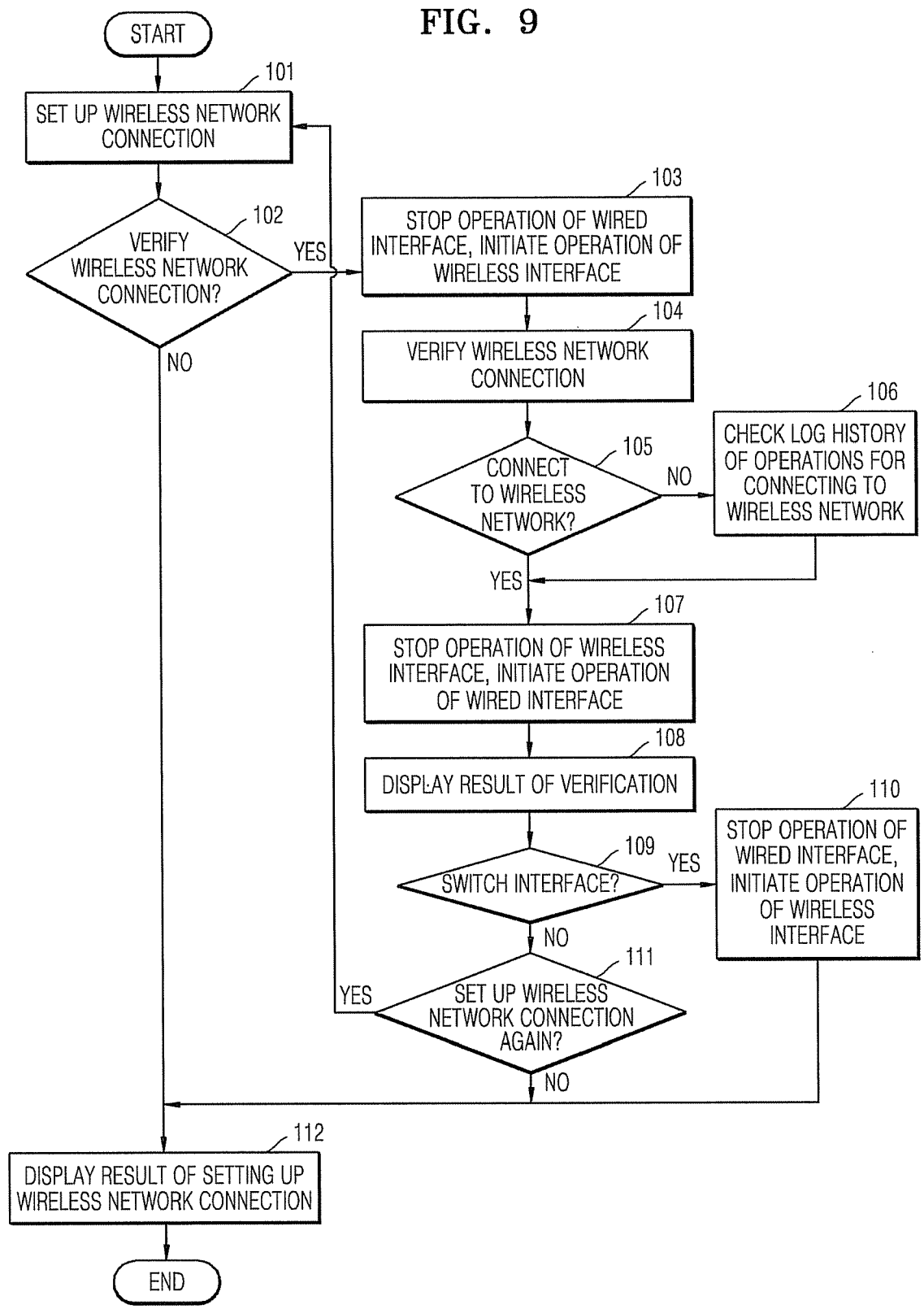
FIG. 9 is a flowchart illustrating a method of setting up a network connection, according to an embodiment of the present invention.

FIG. 9 is a flowchart illustrating a method of setting up a network connection, according to an embodiment of the present invention. Referring to FIG. 9, the method of setting up a network connection includes sequential steps that are processed series by the first device 1 illustrated in FIG. 2. Therefore, descriptions of the first device 1 provided above apply to the method of setting up a network connection according to the current embodiment, even if not repeated below. However, aspects of the present invention are not limited thereto.

In operation 101, the user interface module 13 transmits a dialog box receiving input values setting up a wireless network connection via the wireless interface 12, to the second device 2 via the wired interface 11 currently operating, and receives a setup value setting up a wireless network connection via the wireless interface 12, from the second device 2 via the wired interface 11, in response to the transmission of the user interface. Next, the control unit 14 sets up a wireless network connection via the wireless interface 12 according to the setup value received by the user interface module 13.

In operation 102, when the control unit 14 completes setting up the wireless network connection, the user interface module 13 transmits a user interface, which is a user interface inquiring whether the user wants to verify the wireless network connection via the wireless interface 12, to the second device 2 via the wired interface 11, and receives a selection value selecting whether to verify the wireless network connection via the wireless interface 12 from the second device 2 via the wired interface 11, in response to the transmission of the user interface. If the selection value instructs verification of the wireless network connection, the method proceeds to operation 103. If the selection value does not instruct verification of the wireless network connection, the method proceeds to operation 112.

In operation 103, the control unit 14 stops operation of the wired interface 11 and initiates operation of the wireless interface 12.

In operation 104, the control unit 14 determines whether the wireless interface 12 currently operating is connected to a wireless network.

In operation 105, if the control unit 14 determines in operation 104 that the wireless interface 12 is connected to a wireless network, the method proceeds to operation 106. If the control unit 14 determines in operation 104 that the wireless interface 12 is not connected to a wireless network, the method proceeds to operation 107.

In operation 106, the control unit 14 checks a history of operations of connecting the wireless interface 12 to the wireless network.

In operation 107, the control unit 14 stops operation of the wireless interface 12 and initiates operation of the wired interface 11.

In operation 108, the user interface module 13 transmits a user interface indicating a result of verifying the wireless network connection performed by the control unit 14 to the second device 2 via the wired interface 11. In a case where the wireless interface 12 is not normally connected to a wireless network, a user interface, indicating a history of connecting operations performed by the control unit 14, is transmitted. The result of verifying the wireless network connection performed by the control unit 14 may also be displayed on a display apparatus installed in the first device 1.

In operation 109, the user interface module 13 receives a selection value selecting whether to switch from the wired interface 11 to the wireless interface 12 from the second device 2 via the wired interface 11. If the selection value instructs switching from the wired interface 11 to the wireless interface 12, the method proceeds to operation 110. If the selection value does not instruct switching from the wired interface 11 to the wireless interface 12, the method proceeds to operation 111.

In operation 110, the control unit 14 stops operation of the wired interface 11 and initiates operation of the wireless interface 12. Then, the method proceeds to operation 112.

In operation 111, the user interface module 13 receives a selection value selecting whether to set up a wireless network connection via the wireless interface 12 again. If the selection value setting up a wireless network connection again is selected, the method returns to operation 101. If the selection value setting up a wireless network connection again is not selected, the method proceeds to operation 112.

In operation 112, the user interface module 13 transmits a dialog box, indicating a result of setting up a wireless network connection, to the second device 2 via either the wired interface 11 or the wireless interface 12. The result of setting up a wireless network connection performed by the control unit 14 may also be displayed on a display apparatus installed in the first device 1.

As described above, in the prior art, that is, when the method is switched from operation 102 directly to operation 112, a wireless network connection can only be established after a wired communication path is removed. Therefore, a user cannot determine whether a wireless interface is normally connected to a wireless network. If there is an error while the wireless network connection is being set up, both a wireless network and a wired network are disconnected.

On the contrary, in a case where operations 103 through 111 are performed together according to the embodiment described above, a network connection via a wired interface is temporarily switched to a wireless interface to determine whether the wireless interface is connected to a wireless network, and the wireless interface is switched back to the wired interface when the determination is completed. Therefore, disconnection of a network connection due to switching between the wired interface and the wireless interface can be prevented, and thus a continuous network connection can be guaranteed. Furthermore, a user can determine a result of verifying a network connection via a wireless interface, and can also determine a history of operations of connecting the wireless interface to a wireless network. The user can set up a network connection via the wireless interface again based on the result of verifying a network connection via a wireless interface and the history of operations of connecting the wireless interface to a wireless network.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of setting up a network connection of an image forming device connectable to a network via a first interface and a second interface, the method comprising:
   setting up a network connection via the second interface;
   temporarily stopping operation of the first interface and initiating operation of the second interface after the setting up of the network connection via the second interface is completed without removing the network connection via the first interface;
   determining whether the second interface is connected to the network; and
   stopping operation of the second interface and initiating operation of the first interface if determined that the second interface is connected to the network.

2. The method of claim 1, wherein the first interface and the second interface use the same MAC address.

3. The method of claim 1, further comprising, stopping the operation of the first interface and initiating the operation of the second interface after the stopping of operation of the second interface and initiating operation of the first interface if determined that the second interface is connected to the network.

4. The method of claim 1, further comprising:
  checking a history of operation of connecting the second interface to the network if determined that the second interface is not connected to a network; and
  displaying a result of the checking of the history of connecting operations.

5. The method of claim 1, further comprising, setting up a network connection of the second interface again if determined that the second interface is not connected to a network.

6. The method of claim 1, further comprising displaying a result of setting up a network connection of the second interface.

7. The method of claim 1, wherein the first interface comprises a wired interface and the second interface comprises a wireless interface.

8. The method of claim 1, wherein the stopping of operation of the first interface occurs if the first interface is not currently performing a network-related task.

9. A non-transitory computer readable recording medium having recorded thereon a computer program executing a method of setting up a network connection of an image forming device, connectable to a network via a first interface and a second interface on a computer, the method comprising:
  setting up a network connection via the second interface;
  temporarily stopping operation of the first interface and initiating operation of the second interface after the setting up of the network connection via the second interface is completed without removing the network connection via the first interface;
  determining whether the second interface is connected to a network; and
  stopping operation of the second interface and initiating operation of the first interface if determined that the second interface is connected to a network.

10. An image forming device supporting a plurality of interfaces, the apparatus comprising:
  a first interface connecting to a first network;
  a second interface connecting to a second network; and
  a control unit controlling operation of the first interface and the second interface, wherein the control unit temporarily stops operation of the first interface, initiates operation of the second interface without removing the network connection via the first interface, and determines whether the second interface is connected to a network, and, after the determination is completed, stops operation of the second interface and initiates operation of the first interface.

11. The image forming device of claim 10, further comprising a user interface module, wherein the control unit sets up a network connection via the second interface according to a setup value received by the user interface module.

12. The image forming device of claim 10, wherein the first interface and the second interface use the same MAC address.

13. The image forming device of claim 10, wherein the control unit stops operation of the first interface and initiates operation of the second interface.

14. The image forming device of claim 10, further comprising a user interface module,
  wherein, if determined that the second interface is not connected to a network, the control unit checks a history of operation of connecting the second interface to the network and the user interface module displays a result of the checking of the history of connecting operations.

15. The image forming device of claim 10, wherein, if determined that the second interface is not connected to a network, the control unit sets up a network connection of the second interface again.

16. The image forming device of claim 10, further comprising a user interface module displaying a result of the setting up of the network connection of the second interface.

17. The image forming device of claim 10, wherein the first interface comprises a wired interface, and the second interface comprises a wireless interface.

18. The image forming device of claim 10, wherein the stopping of the operation of the first interface occurs if the first interface is not currently performing a network-related task.

19. An image forming device comprising:
  a first interface connecting to a first network;
  a second interface connecting to a second network;
  a control unit, which temporarily stops operation of the first interface, initiates operation of the second interface without removing the network connection via the first interface, and determines whether the second interface is connected to a network, and, after the determination is completed, stops operation of the second interface and initiates operation of the first interface;
  an image forming unit forming an image with respect to printing data transmitted via the first interface or the second interface; and
  a display unit displaying a result of the determination of whether the second interface is connected to the network.

20. The image forming device of claim 19, wherein the control unit checks a history of operation of connecting the second interface if determined that the second interface is not connected to a network and displaying the history of operation of connecting the second interface on the display unit.

* * * * *